United States Patent [19]

Watanabe et al.

[11] Patent Number: 5,538,543
[45] Date of Patent: Jul. 23, 1996

[54] FUEL VAPOR CAPTURING CANISTER HAVING INCREASED DISTANCE OF FLOW OF FUEL VAPOR PASSING THROUGH ADSORBENT LAYER

[75] Inventors: Hideo Watanabe; Hiroaki Mihara, both of Wako; Kouichi Ikuma, Hamakita; Takenori Suzuki, Hamamatsu, all of Japan

[73] Assignees: Toyo Roki Seizo Kabushikikaisha, Shizuoka-ken; Honda Giken Kogyo Kabushiki Kaisha, Tokyo, both of Japan

[21] Appl. No.: 341,191

[22] Filed: Nov. 18, 1994

[30] Foreign Application Priority Data

Nov. 19, 1993 [JP] Japan ................................ 5-314567

[51] Int. Cl.⁶ ........................................... B01D 53/04
[52] U.S. Cl. ........................ 96/131; 95/146; 96/139; 96/147; 96/152; 123/519
[58] Field of Search ................ 95/143, 146; 55/385.3; 96/142, 147, 131, 132, 135, 136, 139, 152; 123/519

[56] References Cited

U.S. PATENT DOCUMENTS

| 4,203,401 | 5/1980 | Kingsley et al. ................ 123/519 |
|---|---|---|
| 4,308,840 | 1/1982 | Hiramatsu et al. .............. 123/519 |
| 4,338,106 | 7/1982 | Mizuno et al. .................. 96/139 |
| 4,448,594 | 5/1984 | Kozawa ........................... 123/519 |
| 4,496,379 | 1/1985 | Kozawa ........................... 123/519 |
| 5,148,793 | 9/1992 | Reddy ............................. 96/131 |

Primary Examiner—Jay H. Woo
Assistant Examiner—Duane S. Smith
Attorney, Agent, or Firm—Wenderoth, Lind & Ponack

[57] ABSTRACT

A fuel vapor capturing canister includes a casing formed into the shape of a cylinder and accommodating an adsorbent material and a plurality of partition plates each formed of an impermeable material. The adsorbent material accommodated in the casing has one of two faces communicating with the atmosphere and the other face communicating both with a fuel storage system and an intake system of an engine. The partition plates are disposed in the casing so as to divide the adsorbent material into a plurality of layers. The partition plates has respective communicating holes formed so as not to lie one above another. This arrangement of the partition plates lengthens a path of fuel vapor passing through the activated carbon layers. Since the distance of flow of the fuel vapor in contact with the adsorbent material is thus increased, the fuel component adsorbing efficiency can be improved.

3 Claims, 6 Drawing Sheets

Prior Art

FUEL VAPOR CAPTURING CANISTER HAVING INCREASED DISTANCE OF FLOW OF FUEL VAPOR PASSING THROUGH ADSORBENT LAYER

BACKGROUND OF THE INVENTION

1. Field of the Invention

This invent ion relates to a fuel vapor capturing canister capturing fuel vapor produced in a fuel system of an engine by means of a layer of adsorbent material to prevent dissipation of the fuel vapor into the atmosphere, and more particularly to such a canister of the type having a plurality of divided layers of adsorbent material.

2. Description of the Prior Art

Japanese Patent Application Kokai No. 50-22921 (unexamined published patent application) discloses a conventional canister of the above-described type. Referring to FIG. 8 illustrating the disclosed canister, a cylindrical casing 1 formed of an impermeable material accommodates an activated carbon layer 2 therein. One of two surfaces of the activated carbon layer 2 communicates with the atmosphere through an opening 3a of a retainer. The other surface of the activated carbon layer 2 communicates both with a fuel tank 4 and with an intake pipe 5 through separate openings 1a and 1b respectively. The activated carbon layer 2 is divided into two layers 2a and 2b axially of the casing 1 by a permeable plate-shaped elastic body 6.

In the above-described construction, fuel vapor produced in the fuel tank 4 enters the upper activated carbon layer 2a through the opening 1a. Passing through the permeable elastic body 6, the fuel vapor then enters the lower activated carbon layer 2b. The fuel component is thus captured by the activated carbon as the fuel vapor passes through its layer. Upon starting an engine, the negative pressure is supplied to the opening 1b communicating with the intake pipe 5. Air is drawn through the lower activated carbon layer 2b, the elastic body 6 and the upper activated carbon layer 2a sequentially, whereupon the fuel component captured by the activated carbon is purged therefrom to be supplied through the intake pipe 5 to the engine.

In the above-described canister, the fuel vapor is adsorbed and purged as the air containing it flows axially of the casing 1. Accordingly, the distance that the air containing the fuel vapor passes through the activated carbon layer 2 depends upon the length of the casing 1. The fuel vapor capturing efficiency is lowered as the casing 1 becomes shorter. Thus, the above-described canister poses a problem of the fuel vapor capturing efficiency.

SUMMARY OF THE INVENTION

Therefore, an object of the present invention is to provide a canister which can improve the fuel vapor capturing performance without rendering the size of the casing too large.

To achieve the object, the present invention provides a canister comprising a casing formed into the shape of a cylinder and accommodating an adsorbent material therein. The adsorbent material accommodated in the casing having one side communicating with the atmosphere and the other side communicating with a fuel storage system and an intake system of an engine. A plurality of partition walls, each formed of a plate-shaped impermeable member are disposed in the casing so as to divide the adsorbent material into a plurality of layers. The partition walls having respective communicating holes formed therein so as not to lie one above the other.

According to the above-described construction, the layer of adsorbent material is divided into a plurality of layers by the partition walls each formed of a plate-shaped impermeable member. The fuel vapor passes through the layers of adsorbent material via the communicating holes which are formed so as not to lie one above the other. Accordingly, the fuel vapor enters one of the divided adsorbent layers through the communicating hole(s) of one partition wall. The fuel vapor moves obliquely through the adsorbent layer when it passes through said adsorbent layer and exits through the communicating hole(s) of the subsequent partition wall. The fuel vapor thus passes through the adsorbent layers obliquely in zigzags through the casing.

Since each partition wall is formed of a plate-shaped impermeable member, part of the fuel vapor is repelled on each partition wall and then diffused. Furthermore, the fuel vapor tends to spread around when it has passed through a communicating hole. Consequently, the absorbent material is used efficiently.

Since the fuel vapor passes obliquely through each of the divided adsorbent layers, it moves in zigzags through the casing. Consequently, the period of time in which the fuel vapor is in contact with the adsorbent layer is increased. Thus, the invention provides a canister in which the fuel vapor capturing efficiency is improved.

Another object of the invention is to provide canister which has a simplified construction.

To achieve the object, the present invention provides a canister in which the partition walls divide the adsorbent material so that layers of the adsorbent material are aligned axially of the casing.

According to the above-described construction, the first partition wall is disposed in the casing after the first layer of adsorbent material has been put into the casing. Then, another partition wall is disposed in the casing after the second lay adsorbent material has been put into the casing. Thus, since the partition walls and the adsorbent material are alternately put into the casing, the canister can be assembled readily. In particular, since the partition walls are put into the casing so that the communicating holes are not aligned, the work required to assemble the canister is simplified.

Another object of the present invention is to provide a canister wherein a path of the fuel vapor flowing through the adsorbent layer in the casing is further lengthened.

To achieve this object, the present invention provides a canister wherein the partition walls divide the adsorbent material in the casing obliquely relative to an axis of the casing. The communicating holes are formed in the respective partition walls so that a communicating path, along which fuel vapor produced in the fuel storage system passes, is lengthened. More specifically, the adsorbent material is divided into a plurality of layers. In the adsorbent layer having a surface communicating with the atmosphere, the obliquely disposed partition wall defining said layer has a communicating hole positioned so as to be farthest away from the communicating surface. The obliquely disposed partition wall defining the layer having a surface communicating with the fuel storage system and the intake system of the engine also has a communicating hole formed so as to be farthest away from the communicating surface. The fuel vapor entering the adsorbent layer passes through the same to the communicating hole farthest away from the entrance and further enters the subsequent adsorbent layer, passing through the same to the communicating hole farthest away from the entrance. Thus, since the path of the fuel vapor passing through the adsorbent material is lengthened, the capturing and purge of the fuel vapor is performed efficiently.

BRIEF DESCRIPTION OF THE DRAWINGS

Other objects, features and advantages of the present invention will become clear upon reviewing the following description of the preferred embodiment thereof, made with reference to the accompanying drawings, in which.

DESCRIPTION OF THE PREFERRED EMBODIMENTS

Figure 1:
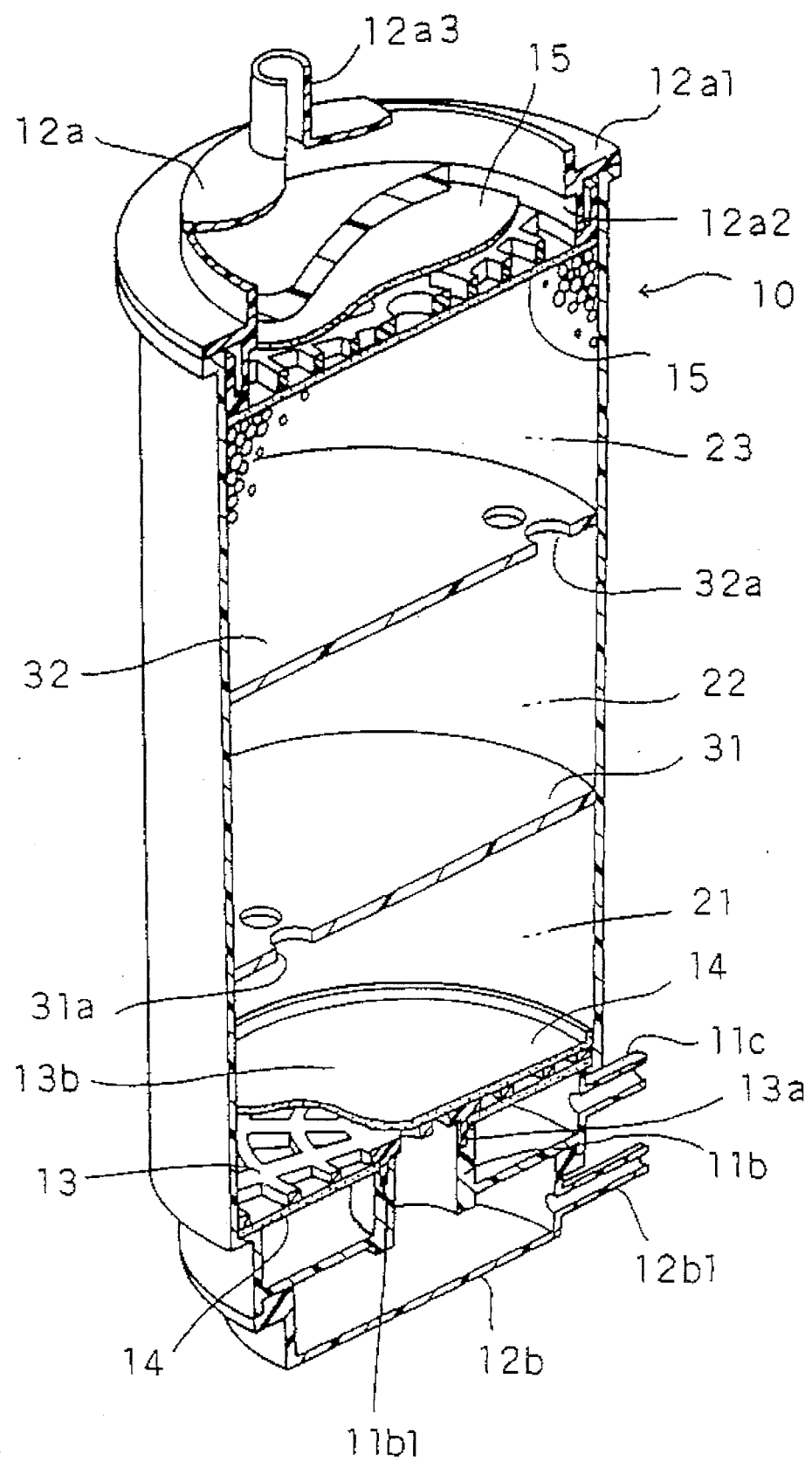
FIG. 1 is a partially broken perspective view of a first embodiment of a canister in accordance with the present invention.
Figure 2:
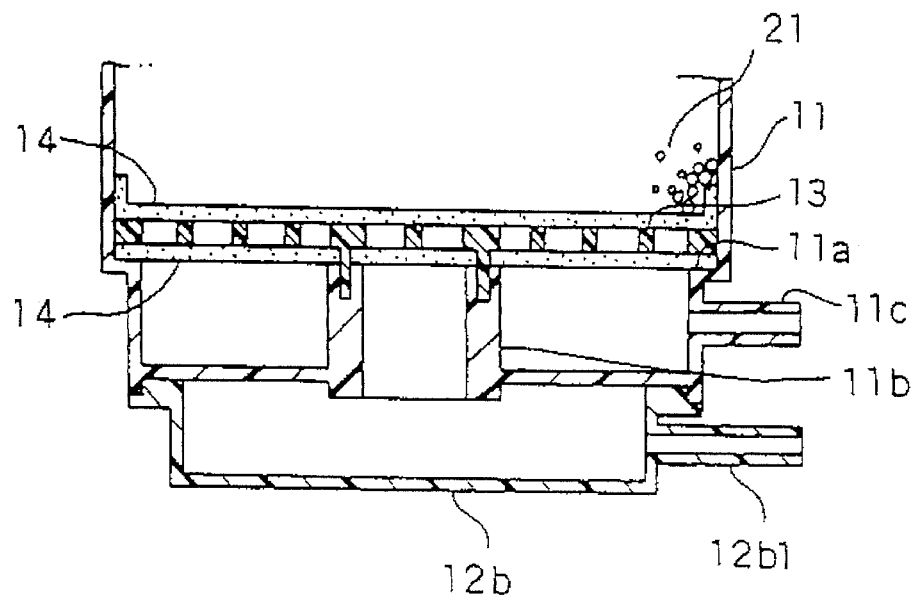
FIG. 2 is a longitudinal sectional view of a lower portion of the canister.
Figure 3:
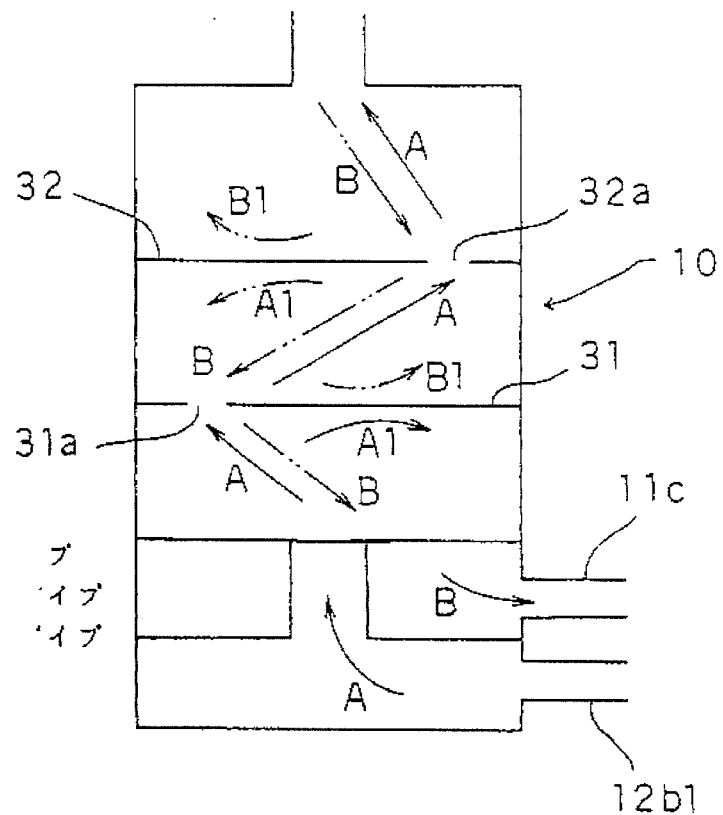
FIG. 3 is a schematically diagrammatic sectional view of the canister showing a path of fuel vapor passing through a layer of adsorbent material.

A first embodiment of the present invention will be described with reference to FIGS. 1 to 3. Referring to FIG. 1, a canister comprises a casing 10 including a cylindrical body 11, an upper lid 12a and a bottom lid 12b. The diameter of the bottom of the cylindrical body 11 is reduced such that a stepped portion 11a is formed on the inner periphery thereof as shown in FIG. 2. A cylindrical portion 11b is formed to protrude from the central bottom of the cylindrical body 11. The height of the cylindrical portion 11b corresponds to that of the stepped portion 11a. A drainboard-like lattice member 13 is placed on the stepped portion 11a and the lattice member 13. The lattice member 13 has a cylindrical rib 13a protruding from the central underside thereof. The rib 13a is inserted into an annular groove 11b1 formed in the upper end of the cylindrical portion 11b so that the lattice member 13 is secured in position. Two filter pads 14 each having gas permeability and elasticity are provided on the top and the underside of the lattice member 13 respectively.

The outer periphery of the cylindrical body 11 is formed with a suction pipe 11c located between the stepped portion 11a and the bottom. The suction pipe 11c communicates between the interior and exterior of the cylindrical body 11. The bottom lid 12b is formed into the shape of a dish having an upper opening the periphery of which is hermetically bonded to the underside periphery of the cylindrical body 11. An exhaust pipe 12b1 communicating between the interior and exterior of the dish-shaped bottom lid 12b is also formed on the peripheral wall of the same. The suction pipe 11c is connected to an intake system of an engine while the exhaust pipe 12b1 is connected to a fuel storage system of the engine.

The filter pad 14 is placed on the top of the lattice member 13 as described above. A predetermined amount of activated carbon is put into the casing 10 until it reaches the level equal to one third of the whole height of the cylindrical body 11. A lower partition plate or partition wall 31 formed of impermeable material, is disposed on the activated carbon. Another predetermined amount of activated carbon is put into the casing 10 until it reaches the level equal to two thirds of the height of the cylindrical body 11. An upper partition plate or partition wall 32 formed of impermeable material, is further disposed on the activated carbon. Finally, another predetermined amount of activated carbon is put into the cylindrical body 11 until it reaches the upper end of the casing.

Each of the lower and upper partition plates 31, 32 has a contour in accord with the configuration of the inner periphery of the cylindrical body 11 and are loosely fitted with the same, thereby being fixed in position. Three communicating holes 31a are formed in a peripheral portion of the lower partition plate 31 and three communicating holes 32a are also formed in a peripheral portion of the upper partition plate 32. The lower and upper partition plates 31, 32 are displaced 180 degrees so that the communicating holes 31a, 32a are not laid one above another. A layer of the activated carbon between the lattice member 13 and the lower partition member 31 will be referred to as a lower activated carbon layer 21, a layer of the activated carbon between the lower and upper partition plates 31, 32 as an intermediate activated carbon layer 22 and a layer of the activated carbon over the upper partition plate 32 as an upper activated carbon layer 23.

Another drainboard-like lattice member 16 is placed on the upper surface of the upper activated carbon layer 23. The lattice member 16 has a peripheral portion formed into the shape of a short circular cylinder so that the peripheral portion is closely fitted with the inner peripheral wall of the cylindrical body 11. Two filter pads 15 each having permeability and elasticity are disposed on the top and the underside thereof respectively.

The upper lid 12a is formed into the shape of a dish having a lower opening. The upper lid 12a has a flat flange 12a1 formed on the peripheral edge thereof. The flange 12a1 has a presser wall 12a2 forming into the shape of a short cylinder and extending downwardly from the inner peripheral underside thereof. The outer diameter of the presser wall 12a2 is smaller than the inner diameter of the peripheral edge of the lattice member 16. Accordingly, the upper lid 12a is bonded at its flange 12a1 to the upper end of the cylindrical body 11 to be thereby secured, pressing the presser wall 12a2 from above the lattice member 16. An atmosphere pipe 12a3 is formed on the upper face of the upper lid 12a to communicate between the interior and exterior of the upper lid 12a.

The operation of the canister will now be described. The suction pipe 11c is connected to one of two ends of a pipe which is further connected at the other end to an intake system of an engine. The exhaust pipe 12b1 is connected to one of two ends of a pipe which is further connected at the other end to a fuel tank. Fuel in the fuel tank is vaporized when the atmospheric temperature rises in the stopped state of the engine. The resultant fuel vapor enters the dish-shaped bottom lid 12b through the exhaust pipe 12b1. The fuel vapor further enters the lower activated carbon layer 21 through the cylindrical portion 11b. The fuel vapor flows upwardly in the lower activated carbon layer 21 with the fuel component being adsorbed by the activated carbon. In this regard, the fuel vapor flows upwardly, diffusing transversely in the activated carbon layer 21.

Reaching the upper end of the lower activated carbon layer 21, the fuel vapor enters the intermediate activated carbon layer 22 through the communicating holes 31a formed in the peripheral portion of the lower partition plate 31. Flowing upwardly in the intermediate activated carbon layer 22, the fuel vapor enters the upper activated carbon layer 23 through the communicating holes 32a of the upper partition plate 32. The communicating holes 31a of the lower partition plate 31 and the communicating holes 32a of the upper partition plate 32 are located oppositely though they are formed in the peripheral portions of the lower and upper partition plates 31, 32 respectively. Accordingly, the fuel vapor flows obliquely upwardly in the lower activated carbon layer 21, as shown by solid line A in FIG. 3. The fuel vapor flows in the intermediate activated carbon layer 22 with the increased obliqueness. The fuel vapor also flows in the upper activated carbon layer 23 with the obliqueness approximately same as that in the lower activated carbon layer 21. Part of the fuel vapor that has not passed through each of the communicating holes 31a, 32a is repelled on each of the partition plates 31, 32, diffusing as shown by solid lines A1 in FIG. 3. Furthermore, when the fuel vapor having diffused in the activated carbon layer passes through each of the partition plates 31, 32, its flow paths are restricted by the communicating holes 31a, 32a located oppositely to each other. Accordingly, the fuel vapor tends to diffuse transversely when having passed through the communicating holes 31a, 32a.

According to the above-described embodiment, the lower and upper partition plates 31, 32 having the respective communicating holes 31a, 32a divide the activated carbon in the casing 10 into three layers. The partition plates 31, 32 are displaced 180 degrees in the casing 10 so that the communicating holes 31a, 32a are not laid one above another. Consequently, the path of the fuel vapor passing through the activated carbon layers can be increased, that is, the distance between the communicating holes 31a, 32a can be increased. Since the distance of flow of the fuel vapor in contact with the activated carbon is thus increased, the fuel component adsorbing and purging efficiency can be improved.

Upon start of the engine, the negative pressure is produced in the intake system. The negative pressure is supplied to the suction pipe 11c of the casing 10 of the canister. Since only the atmosphere pipe 12a3 of the casing 10 communicates with the atmosphere, the air is drawn through the atmosphere pipe 12a3 into the dish-shaped upper lid 12a. The air passes through the upper activated carbon layer 23, the communicating holes 32a of the upper partition plate 32, the intermediate activated carbon layer 22, the communicating holes 31a of the lower partition plate 31 and the lower activated carbon layer 21 sequentially. Since the air passing through the activated carbon layers has low fuel concentration the fuel component captured by the activated carbon is evaporated by the air and released from the activated carbon. Thus the air containing the fuel component in high concentration is supplied to the intake system of the engine through the intake pipe 11c. Since the air containing the fuel vapor passes obliquely through each activated carbon layer, its path is increased, which enhances evaporation of the fuel component. The above-described suction path is shown by arrows B in FIG. 3. Part of the fuel vapor not passing through the communicating holes 31a, 32a is repelled on the partition plates 31, 32, thereby diffusing as shown by arrows B1.

Figure 4:
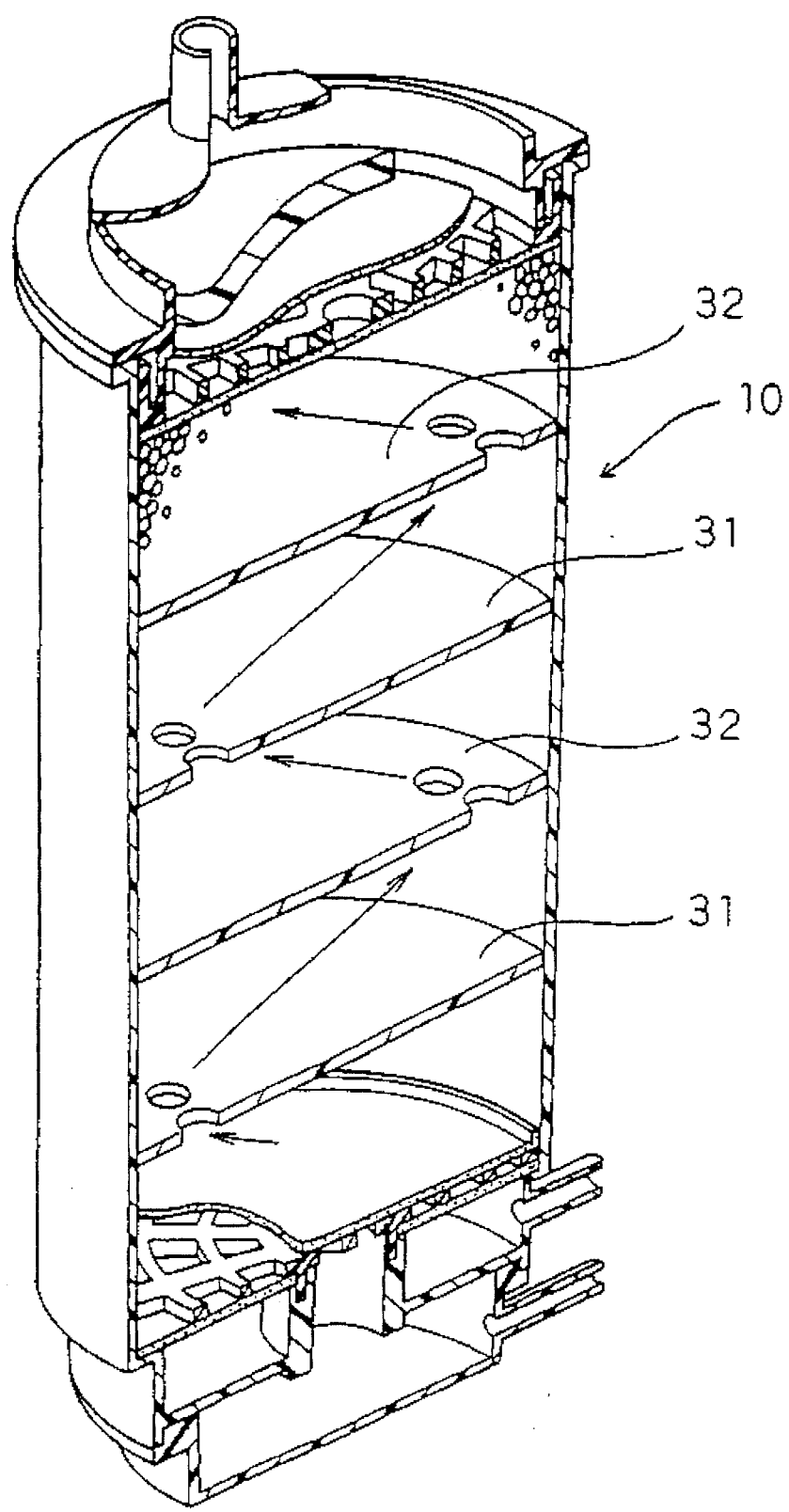
FIG. 4 is a partially broken perspective view of a modified form of the canister.
Figure 5:
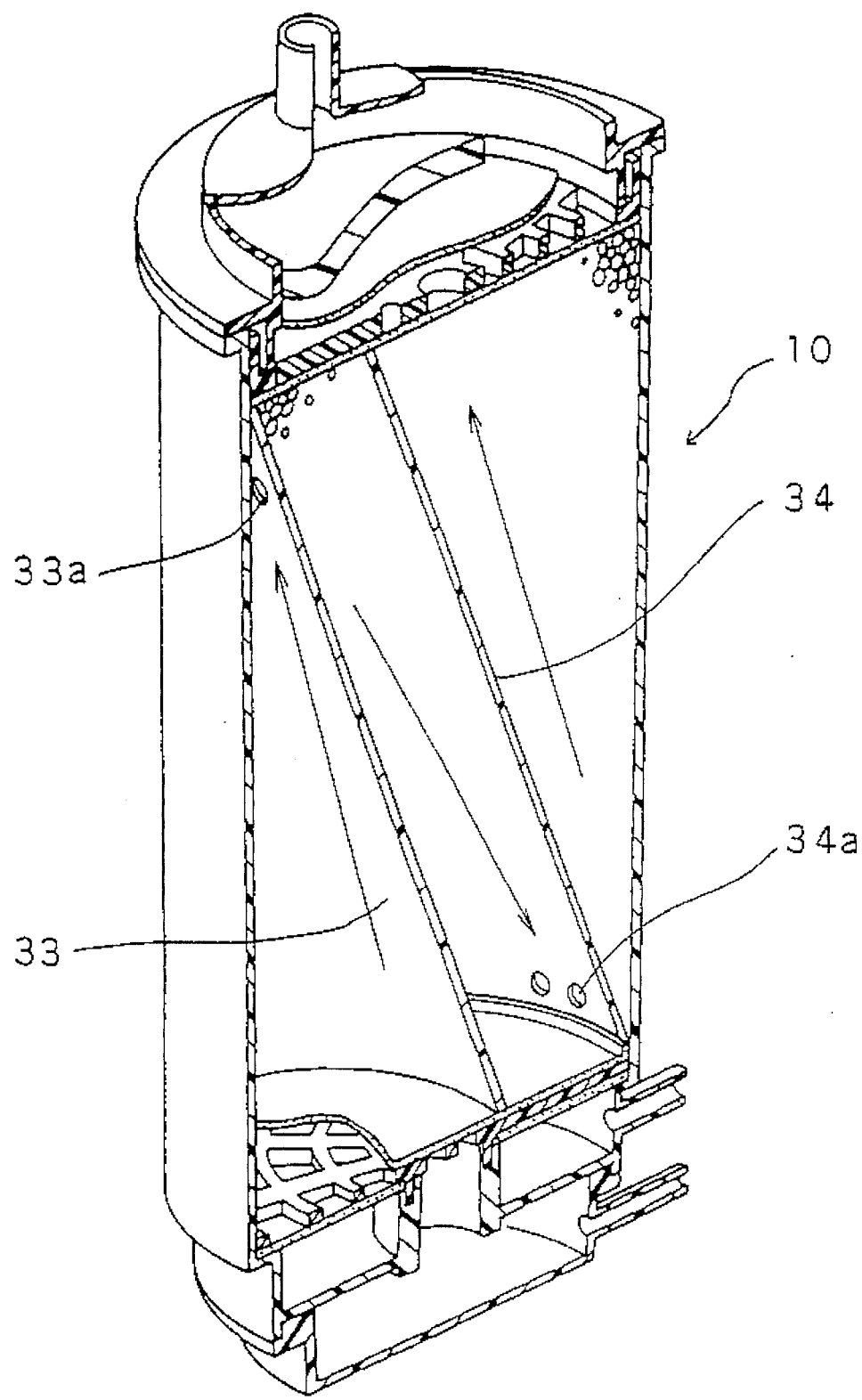
FIG. 5 is a partially broken perspective view of another modified form of the canister.

In the foregoing embodiment, the lower and upper partition plates 31, 32 are disposed horizontally in the casing 10 so that the communicating holes 31a, 32a thereof are located oppositely to each other FIGS. 4 and 5 illustrate modified forms to achieve the construction for lengthening the path of the fuel vapor passing through the activated carbon layers. In the construction shown in FIG. 4, the number of the partition plates 33 is increased while in the construction shown in FIG. 5, the partition plates 34, 35 are disposed obliquely vertically in the casing 10 so that the communicating holes 34a, 35a are located in the upper end of the partition plate 34 and the lower end of the partition plate 35 respectively. Furthermore, the number of the communicating holes may be more than or less than three. The communicating holes may or may not be located oppositely to each other.

When the partition plates 34, 35 are disposed obliquely vertically as shown in FIG. 5, the adsorbent material is divided obliquely vertically into three layers in the casing body 11. For the purpose of effectively using the length of the obliquely divided layers of the adsorbent material, the communicating holes 34a are formed in the upper end of the partition plate 34 while the communicating holes 35a are formed in the lower end of the partition plate 35. As the result of the above-described construction, the fuel vapor enters the adsorbent layer through its lower surface and passes therethrough nearly to the opposite upper surface of the adsorbent layer. Subsequently, the fuel vapor returns through the adsorbent layer nearly to the lower surface of the adsorbent layer and then, it again passes through the adsorbent layer, exiting out of the upper surface of the adsorbent layer. Consequently, the above-described construction provides the same fuel vapor capturing and evaporating efficiency as that in the case where the adsorbent layer having the threefold length is used.

Figure 6:
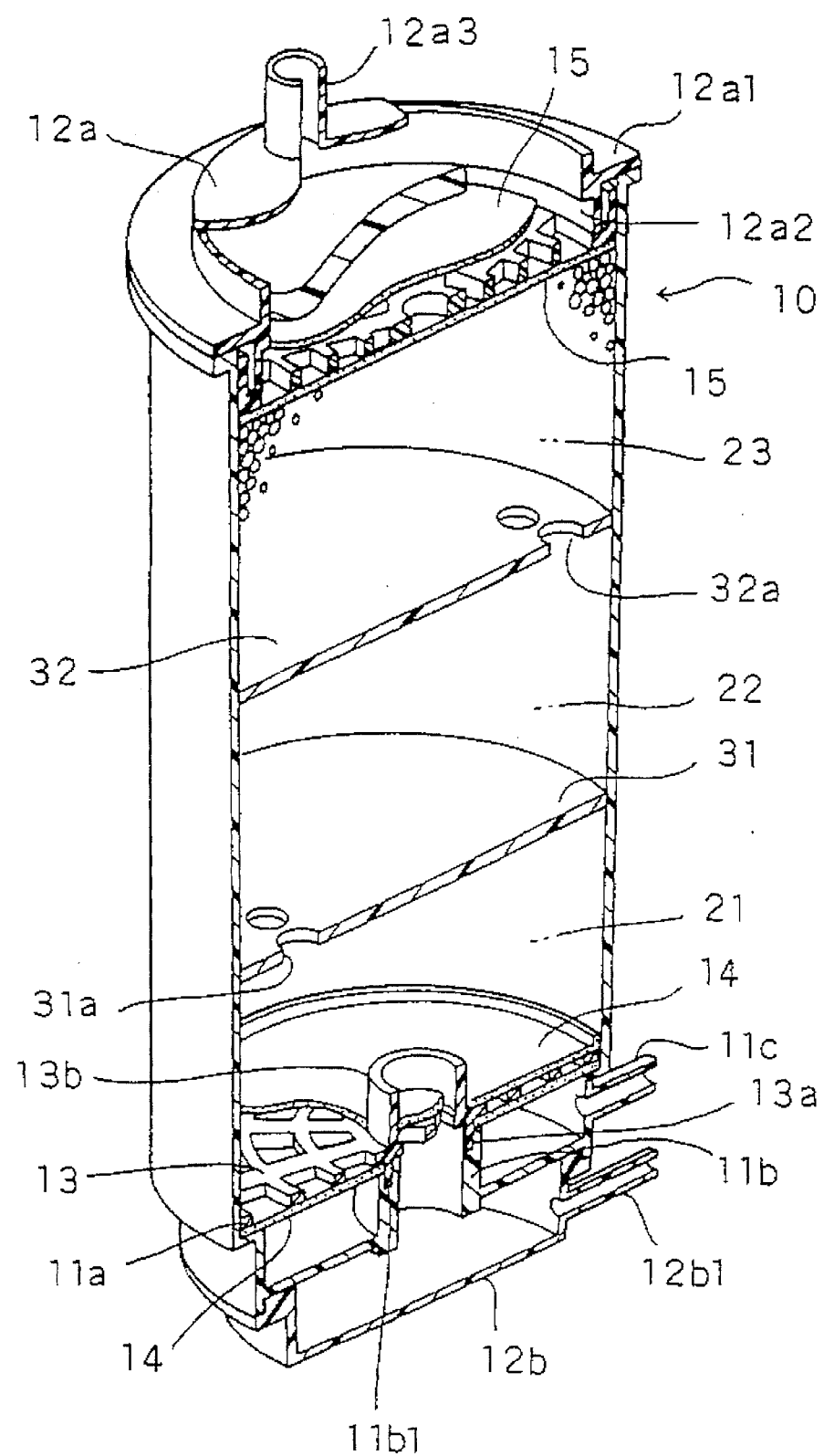
FIG. 6 is a partially broken perspective view of a second embodiment of a canister in accordance-with the present invention.
Figure 7:
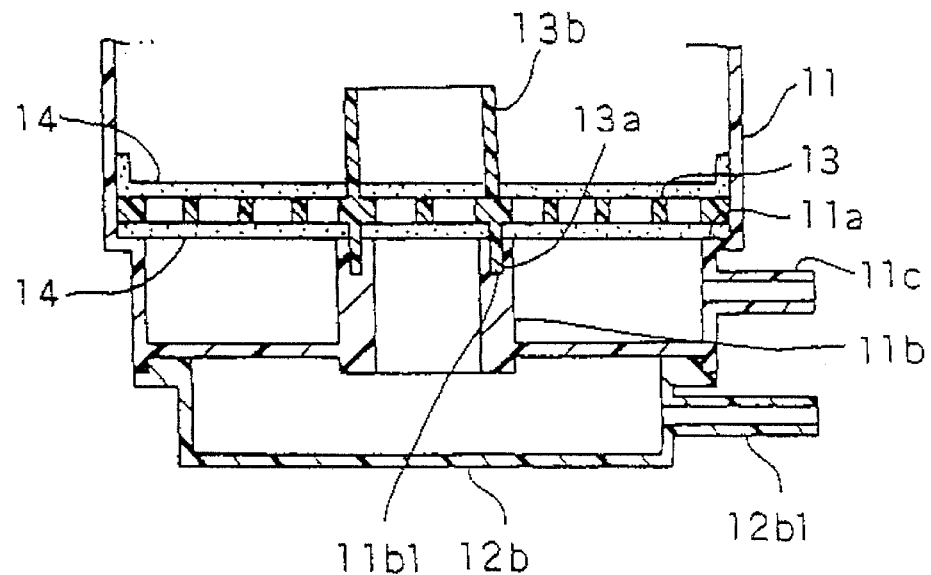
FIG. 7 is a longitudinal sectional view of a lower portion of the canister of the second embodiment.

FIGS. 6 and 7 illustrate a second embodiment of the present invention. A fuel intake cylinder 13b similar to the lib 13a is formed on the side of the lattice member 13 opposite the side on which the rib 13a is formed. When the rib 13a is connected to the upper end of the cylindrical portion 11b, the cylindrical portion 11b is contiguous with the fuel intake cylinder 13b.

Figure 8:
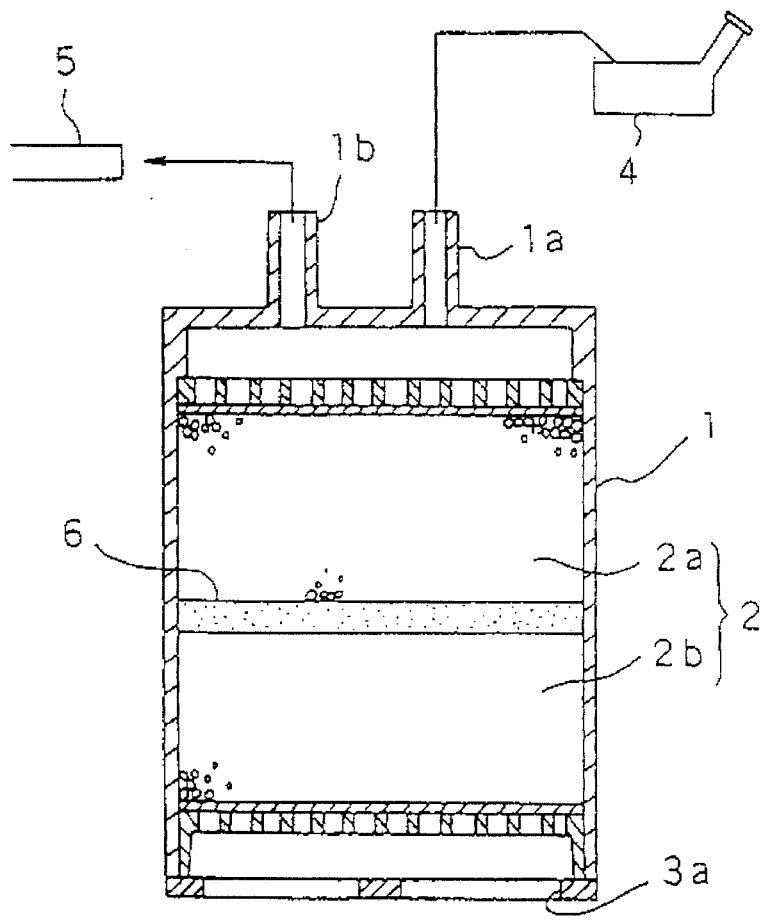
FIG. 8 is a longitudinal sectional view of conventional canister.

During operation, the fuel vapor produced by vaporization of fuel in the fuel tank enters the bottom lid 12b. The fuel vapor then enters the lower activated carbon layer 21 through the cylindrical portion 11b and the fuel intake cylinder 12b in turn. The fuel vapor flows upwardly in the lower activated carbon layer 21, diffusing transversely. In this regard, the fuel vapor would reach the lower partition plate 31 with insufficient transverse diffusion if the fuel intake cylinder 13b should not have a sufficiently low height. In the embodiment, however, the fuel vapor enters the lower activated carbon layer 21 through an opening of the fuel intake cylinder 13b even when the height of the fuel intake cylinder is low. Accordingly, the fuel vapor produced in the fuel tank upon start of the engine exits out of the opening of the fuel intake cylinder 13b and then passes through the activated carbon layer, whereupon the fuel vapor is supplied to the intake system of the engine. Without the fuel intake cylinder 13b, the fuel vapor having entered the casing 1 through the opening 1a would sometimes be supplied into the suction pipe 5 through the opening 1b without passing through the activated carbon layer 2a, as shown in FIG. 8. In this case, the concentration of the fuel supplied to the engine becomes uneven, which renders the operation of the engine unstable. In the second embodiment, however, the fuel vapor is supplied through the adsorbent layer to the suction system of the engine and accordingly, the operation of the engine can be stabilized.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. A canister comprising:

a cylindrical casing having a central vertical axis, a first end, and a second end, said casing accommodating an adsorbent material therein, said first end having an opening communicating with the atmosphere and said second end having openings for communicating with a fuel storage system and with an intake system of an engine; and a plurality of partition walls dividing said adsorbent material into a plurality of layers and said partition walls being loosely fitted in the casing, said plurality of partition walls each having at least one communicating hole therethrough, each said partition wall being positioned in the casing such that said at least one hole is not in alignment along any direction parallel to said central vertical axis relative to said at least one hole in an adjacent partition wall.

2. A canister as claimed in claim 1, wherein said plurality of partition walls extend horizontally relative the central vertical axis of said casing.

3. A canister as claimed in claim 2, wherein said plurality of partition walls extend obliquely relative to the central vertical axis of said casing.

* * * * *